United States Patent [19]

Arendt

[11] 4,238,577
[45] Dec. 9, 1980

[54] NOVEL ELASTOMER COMPOSITION AND PROCESSES THEREFOR

[75] Inventor: Volker D. Arendt, Princeton, N.J.

[73] Assignee: American Cyanamid Company, Stamford, Conn.

[21] Appl. No.: 967,814

[22] Filed: Dec. 8, 1978

[51] Int. Cl.³ .................. C08L 27/00; C08L 31/02; C08L 63/00
[52] U.S. Cl. .................. 525/286; 525/208; 525/213; 525/223; 525/225; 525/230; 525/232; 525/238; 525/260; 525/263; 525/292; 525/302; 525/304; 525/310
[58] Field of Search .......... 260/836, 879, 884, 885, 260/881, 887, 890; 526/273, 292, 295; 525/244, 263, 266, 242, 286, 292, 302, 304, 310, 260, 293, 208, 213, 223, 225, 230, 232, 238

[56] References Cited

U.S. PATENT DOCUMENTS 3,644,584  2/1972  Fryd ............... 260/879

FOREIGN PATENT DOCUMENTS 1035790  7/1966  United Kingdom ............ 260/879

OTHER PUBLICATIONS

Chemical Abstracts, vol. 66, 47418v, French 1,446,075.

*Primary Examiner*—J. Ziegler
*Attorney, Agent, or Firm*—Frank M. Van Riet

[57] ABSTRACT

A vulcanizable elastomeric composition comprising
(a) from about 89–40%, by weight, based on the total weight of the composition, of an acrylic acid ester, or mixture thereof, having the formula

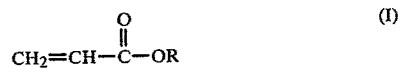

wherein R is an alkyl ($C_1$–$C_4$) radical, —$CH_2CH_2OR'$, wherein R' is an alkyl ($C_1$–$C_4$) radical, or —$CH_2CH_2CN$;
(b) from about 10–45%, by weight, same basis, of bis(2-methoxyethyl)fumarate, bis(2-methoxyethyl)maleate, or mixtures thereof,
(c) from about 1–10%, by weight, same basis, of an unsaturated monomer containing a halogen atom or an epoxy group, and
(d) from 0 to 5%, by weight, of polybutadiene, polychloroprene or polyisoprene.

14 Claims, No Drawings

NOVEL ELASTOMER COMPOSITION AND PROCESSES THEREFOR

BACKGROUND OF THE INVENTION

This invention relates to vulcanizable elastomers, processes for preparing and vulcanizing said elastomers, and the vulcanized elastomers so obtained. More particularly, it relates to vulcanizable elastomeric copolymers of an acrylic ester, or mixture of acrylic esters, bis(2-methoxyethyl)fumarate or bis(2-methoxyethyl)maleate or mixtures thereof, and a halogen or epoxy-containing unsaturated monomer, optionally with a polybutadiene, polyisoprene or polychloroprene resin.

Elastomers based on copolymers of ethyl acrylate, n-butyl acrylate, 2-methoxyethyl acrylate, and 2-cyanoethyl acrylate, or mixtures thereof, with vinyl chloroacetate, are well-known. These elastomers, used quite often in gaskets, seals, valve seats, and the like, although offering many useful properties, frequently tend toward embrittlement at low temperatures. Other polymers which exhibit excellent low temperature properties are deficient in resistance to oil absorption, i.e., they swell excessively on contact with oil.

Since none of the known elastomeric copolymers is completely satisfactory, with respect to both low temperature brittleness and oil absorption, research continues in order to find new copolymers that will provide a more satisfactory relationship between these properties.

SUMMARY OF THE INVENTION

In accordance with the present invention, a vulcanizable elastomeric copolymer composition is provided by copolymerizing a mixture comprising:

(a) from about 89 to 40%, by weight, of an acrylic ester, or mixture of acrylic esters, represented by Formula

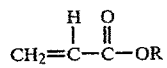 (I)

wherein R represents $C_1-C_4$ alkyl; $-CH_2-CH_2-OR'$, wherein R' represents $C_1-C_4$ alkyl; or $-CH_2-CH_2CN$;

(b) from about 10 to 45%, by weight, of bis(2-methoxyethyl)fumarate, bis(2-methoxyethyl)maleate, or mixtures thereof;

(c) from about 1 to 10%, by weight, of an unsaturated monomer containing either a halogen atom or an epoxy group; and (d) from about 0 to 5%, by weight, of an unsaturated polymer of a major proportion of polybutadiene, polychloroprene or polyisoprene having a molecular weight of from about 500 to 4000.

Examples of monomers which fall within the scope of Formula I include, methyl acrylate, ethyl acrylate, n-propyl acrylate, isopropyl acrylate, n-butyl acrylate, t-butyl acrylate, isobutyl acrylate, 2-methoxyethyl acrylate, 2-ethoxyethyl acrylate, 2-propoxyethyl acrylate, 2-butoxyethyl acrylate, 2-cyanoethyl acrylate and the like.

Preferred mixtures of acrylic esters comprise:

(1) ethyl acrylate and n-butyl acrylate in the weight percent ratio of about 50:50 to about 70:30, respectively, (2) ethyl acrylate, n-butyl acrylate and 2-methoxyethyl acrylate in the weight percent ratio of about 5:65:30 to about 40:35:25, respectively, or (3) n-butyl acrylate, 2-methoxyethyl acrylate, and 2-cyanoethyl acrylate in the weight percent ratio of about 65:25:10 to about 70:25:5, respectively.

The vulcanizable elastomers of the present invention are advantageous in that they are readily processable, that is, they are easily worked and uniformly blended with compounding ingredients on a rubber mill.

The present invention further provides vulcanized elastomer compositions having industrially useful physical properties, particularly good low temperature flexibility and good resistance to swelling on contact with oil.

In addition, the present invention provides a process for preparing said vulcanizable elastomer and a process for vulcanizing the same to obtain said vulcanized elastomer.

DESCRIPTION OF THE INVENTION INCLUDING PREFERRED EMBODIMENTS

In preparing the vulcanizable elastomers of the present invention, a mixture of monomers is copolymerized in the presence of an effective amount of a suitable free radical initiator using emulsion, suspension, or bulk polymerization techniques.

Since the presence of oxygen is detrimental to the desired polymerization reaction, nitrogen purges in the monomers, the initiating mixtures, and the reaction mixture, should be used. Other inert gases may be used in place of nitrogen in the purges, as in conventional procedures.

In the usual methods of emulsion, or suspension polymerization, using an initiator, an aqueous charge containing suitable dispersing agents is placed in the reactor, maintained under agitation and heated to the reaction temperature. Addition of suitable amounts of monomers is made while maintaining the reaction temperature. After the addition of all monomers is complete, the reaction mixture is maintained and reacted for an additional period to minimize the content of unreacted monomer, then cooled. Where the process involves a suspension, the product is generally separated at this time, washed, and dried. Where the process involves an emulsion, the product may be stored as such or the elastomer recovered by coagulation of the emulsion, followed by washing and drying.

Preferably, the method of emulsion, or suspension, polymerization is carried out as described above except that part of the initial water charge is withheld. During the feed of additional monomers, provision is made for the regulated addition of the withheld water in amounts necessary to control temperature at the specific value desired in conjunction with the cooling provided to the reactor jacket. After the feed of additional monomers and withheld water is complete, the usual procedure is followed, as described above. While it is possible to obtain reasonably good temperature control of the reaction mixture by a single steady rate of addition of water throughout most of the monomer feed cycle, it is generally preferable to change rates of water addition at appropriate points in order to obtain more precise temperature control.

Thus, during certain periods of high heat evolution from the polymerization reaction, the rates of water addition used may be two or more times the average rate of addition.

After completion of the monomer feed and water addition, the polymerization process reverts to conventional procedures. The option of additional reaction at slightly elevated temperature may be exercised, if desired, and the subsequent steps of isolation, washing, and drying of the polymer are as in conventional procedures.

Suitable initiators employed in the polymerization procedure include azobis(isobutyronitrile), ammonium persulfate, benzoyl peroxide, lauroyl peroxide, and the like. The preferred initiator is azobis(isobutyronitrile).

The initiator is employed in minor but catalytically effective amounts. From about 0.01% to about 5% of initiator, by weight, based on the weight of copolymerizable monomers present in the reaction mixture, will be effective. The preferred amount of initiator is from about 0.03% to about 0.6%, by weight, on the same basis.

Suitable halogen-containing monomers include vinyl chloroacetate, vinyl bromoacetate, vinyl chloropropionate, allyl chloropropionate, 2-chloro-1-butadiene, 2-chloroethyl vinyl ether, 2-chloroethyl acrylate, and the like. The preferred halogen-containing comonomer is vinyl chloroacetate.

Suitable epoxy-containing monomers include allyl glycidyl ether, glycidyl acrylate, glycidyl methacrylate, and the like. The preferred epoxy-containing comonomer is glycidyl methacrylate.

The unsaturated polymer employed herein is a polybutadiene, polyisoprene, or polychloroprene having a molecular weight from about 500 to 4000. The preferred unsaturated polymer is a low molecular weight polybutadiene.

In the examples which follow, the reactants are abbreviated as follows: ethyl acrylate (EA), n-butyl acrylate (BA), bis(2-methoxyethyl)fumarate (MEF), bis(2-methoxyethyl)maleate (MEM), vinyl chloroacetate (VCA), polybutadiene resin (BDR), 2-cyanoethyl acrylate (CEA), 2-methoxyethyl acrylate (MEA) and dodecyl mercaptan (DDM). All parts and percentages are by weight unless otherwise indicated.

EXAMPLE A

Preparation of Bis(2-Methoxyethyl) Fumarate

Fumaric acid (580 parts) is suspended in 1000 parts of toluene containing 2-methoxyethanol (906 parts and 30 parts of sulfuric acid catalyst are added thereto. The resulting mixture is heated to remove water as a toluene-water azeotrope. After no further water is distilled off, the reaction mixture is cooled to ambient temperature and neutralized by adding aqueous sodium bicarbonate thereto. The reaction mixture is washed with an aqueous solution of sodium chloride; the organic phase is recovered, dried over anhydrous magnesium sulfate and filtered. The filtrate is concentrated under vacuum and the residue is distilled to obtain 978 parts of the desired product (84.5% of theoretical; b.p. 110° C. at 0.2 mm of mercury).

Calculated for C, H, O,: C, 51.7%; H, 6.9%; O, 41.4%
Found: C, 51.7%; H, 6.81%; O, 43.8%

EXAMPLE B

Preparation of Bis(2-Methoxyethyl)Maleate

The procedure of Example 1 is again followed substituting maleic anhydride (490 parts) for the fumaric acid, while utilizing 836 parts of 2-methoxyethanol and 15 parts of concentrated sulfuric acid to obtain the desired product.

Calculated for C,H,O,: C, 51.7%; H, 6.9%; O, 41.4%
Found: C, 52.4%; H, 6.5%; O, 41.1%

The nuclear magnetic resonance spectrum of the product has a sharp proton singlet at 6.31$\pi$ which is consistent with the structure of bis(2-methoxyethyl)-maleate.

EXAMPLE 1

A suspension system comprising 6.5 parts of tricalcium phosphate and 3.5 parts of bentonite clay in 350 parts of water, is charged to a reaction vessel equipped with a cooling jacket and an agitator and purged with nitrogen. Two solutions having the following compositions are prepared and purged with nitrogen.

| Material | Parts by Weight | |
|---|---|---|
| | Solution A | Solution B |
| EA | 66.0 | 236.0 |
| BA | 44.1 | 157.0 |
| MEF | 36.8 | 131.0 |
| VCA | 32.0 | 10.8 |
| BDR | — | 7.5 |
| DDM | 0.04 | 0.055 |

Azobisisobutyronitrile (0.72 part) is dissolved is Solution A at 35° C. and the resulting solution is added to the stirred suspension, previously heated to 95° C., over a period of about 0.5–1.0 minute. The temperature drops to about 80° C. When a reaction exotherm is noted, Solution B and cooling water are simultaneously added to the reaction mixture over a period of about one hour, the temperature being maintained at 80° C. by jacket cooling and the addition of water as necessary. The total amount of water added during the polymerization reaction, about 900 parts, is such that the ratio of water to polymer solids in the final reaction mixture is about 2 to 1, or less. After the addition of Solution B, the copolymer has the following composition in percent, by weight, of total monomers added.

42% EA/28% BA/23% MEF/6% VCA/1% BDR    (A)

When the addition of Solution B is completed, the reaction mixture is held at 80° C. for one hour longer and then steam-stripped for one-half hour to remove unreacted monomer. The reaction mixture is cooled to about 50° C., and the product is isolated, washed, and dried at 70° C. for 16 hours.

EXAMPLES 2-5

In a manner substantially as described in Example 1, elastomeric products are prepared by charging the following compositions in percent by weight of total monomers added.

| Example | | | | |
|---|---|---|---|---|
| 2 | 32% EA/ 28% BA/ | 10% MEF/ 23% MEA/ | 6% VCA/ 1% BDR | (B) |
| 3 | 5% EA/ 50% BA/ | 16% MEF/ 23% MEA/ | 6% VCA | (C) |
| 4 | 7% CEA/ 53% BA/ | 10% MEF/ 23% MEA/ | 6% VCA/ 1% BDR | (D) |

-continued

| Example | | | | |
|---|---|---|---|---|
| 5 | 63% EA/ | 30% MEF/ | 6% VCA/ 1% BDR | (E) |

EXAMPLES 6-10

The elastomers of Examples 1-4 are individually compounded on a conventional two-roll mill with the following materials:

| | Parts by Weight |
|---|---|
| Elastomer | 100 |
| Carbon Black FEF[a] | 50 |
| Sodium Alumino Silicate | 12 |
| DPA-A[b] | 2 |
| m-Phenylinebis(maleimide) | 0.75 |
| Stearic Acid | 2 |
| Sulfur[c] | 0.25 |
| SEH/CS/W[d] | 8 |

[a]Fast extruding furnace carbon black
[b]High temperature reaction product of diphenylamine and acetone
[c]Sulfur dispersed with manganese carbonate
[d]Mixture of sodium 2-ethyl hexanoate/calcium silicate/water of 50/37.5/12.5 parts by weight, respectively The elastomer of Example 5 is compounded with the same materials except that 2 parts, by weight, of symmetrical di-$\beta$-naphthyl-p-phenylenediamine is used instead of the DPA-A.

After curing for 30 minutes at 330° F. and post-curing for 4 hours at 350° F., the vulcanized elastomers are evaluated. The results obtained are reported below under A-E, respectively.

| | A | B | C | D | E |
|---|---|---|---|---|---|
| Tensile Strength (psi) | 1560 | 1530 | 1350 | 1355 | 1515 |
| % Elongation | 145 | 110 | 100 | 70 | 170 |
| 100% Modulus (psi) | 1100 | 1430 | 1350 | — | 875 |
| Shore "A" Hardness | 70 | 70 | 70 | 76 | 75 |

The low temperature properties obtained are as follows:

| | Temperature (°C.) | | | | |
|---|---|---|---|---|---|
| Test | A | B | C | D | E |
| Gehman[a] | −21.7 | −26 | −34.5 | — | −11 |
| T$_{100}$[b] | −32 | −32.5 | −38 | — | −15.6 |
| TMA[c] | — | −33 | −39 | −42 | −17 |

[a]Temperature at inflexion point of temperature-modulus curve (ASTMD-1053).
[b]Temperature at which relative modulus of test sample equals 100 times the original value at 23° C. (ASTMD-1053).
[c]Temperature at inflexion point of temperature-modulus curve using du Pont No. 990 Thermal Mechanical Analyzer.

After aging the resulting vulcanized elastomers for 70 hours at 150° C. in ASTM No. 3 Oil, the properties are as follows:

| | A | B | C | D | E |
|---|---|---|---|---|---|
| % Change in Volume | 19.2 | 19 | 28 | 19.6 | 5.9 |
| Tensile Strength (psi) | 1265 | 1460 | 955 | 1055 | 1500 |
| % Elongation | 130 | 100 | 90 | 60 | 150 |
| Shore "A" Hardness | 60 | 62 | 56 | 65 | 74 |

These results show acceptable physical properties for the resulting vulcanized elastomers. In particular, good low temperature properties are obtained with surprisingly low percent change in volume after 70 hours in ASTM No. 3 Oil at 150° C.

EXAMPLES 11-13

Following the procedure of Example 1, elastomers are prepared utilizing the following charge compositions:

| Example | | |
|---|---|---|
| 11 | 45% BA/ 25% MEA/ 25% MEF/ 4% VCA/ 1% BDR | (F) |
| 12 | 42% EA/ 28% BA/ 23% MEM/ 6% VCA/ 1% BDR | (G) |
| 13 | 45% BA/ 25% MEA/ 25% MEM/ 4% VCA/ 1% BDR | (H) |

EXAMPLES 14-16

The elastomers of Examples 11-13 are individually compounded on a two-roll mill to form mixtures containing 100 parts of the elastomer, 100 parts of Carbon Black FEF, 2 parts of symmetrical di-$\beta$-naphthyl-p-phenylenediamine, 2 parts of stearic acid, 0.25 part of sulfur and 8 parts of SEH/CS/W.

After curing for 30 minutes at 330° F. and postcuring for 4 hours at 350° F., the properties of the vulcanized elastomers are as listed below under F-H, respectively.

| | F | G | H |
|---|---|---|---|
| Tensile Strength (psi) | 1040 | 700 | 655 |
| % Elongation | 170 | 425 | 85 |
| 100% Modulus (psi) | 510 | 195 | 165 |
| Shore "A" Hardness | 62 | 60 | 50 |
| TMA Brittle Point (°C.) | −35.5 | −27 | −42 |

After aging the vulcanized elastomers for 70 hours at 150° C. in ASTM No. 3 Oil, the properties are as follows:

| | F | G | H |
|---|---|---|---|
| % Change in Volume | 24 | 33 | 40 |

The results show an acceptable balance of physical properties for the resulting vulcanized elastomers.

In a manner as described in Examples 11-13, compositions are prepared substituting glycidyl methacrylate for the vinyl chloroacetate. Vulcanization of these elastomers in the manner of Examples 14-16 results in elastomers having acceptable low temperature embrittlement and oil resistance properties.

EXAMPLE 17

The procedure of Example 5 is again followed except that the polybutadiene is replaced by polychloroprene. Substantially equivalent results are observed.

EXAMPLE 18

When the procedure of Example 2 is again followed except that the methoxyethyl acrylate is replaced by n-butoxyethyl acrylate, similar results are obtained.

EXAMPLE 19

Replacement of the vinylchloroacetate of Example 12 with 2-chloroethyl vinylether achieves substantially the same results.

EXAMPLE 20

Polyisoprene and allyl chloropropionate are used to replace polybutadiene and vinyl chloroacetate, respectively, in Example 4 and again excellent results are achieved.

EXAMPLE 21

The procedure of Example 1 is again followed except that the bis(2-methoxyethyl)fumarate is used in 50/50 admixture with bis(2-methoxyethyl)maleate. Similar results are achieved.

I claim:

1. A vulcanizable elastomeric composition comprising a copolymer of:
   (a) 89 to 40%, by weight, based on the total weight of the composition, of an acrylic acid ester, or mixture of acrylic acid esters, represented by the formula $$CH_2=CH-\overset{\overset{O}{\|}}{C}-OR \quad (I)$$

wherein R represents $C_1-C_4$ alkyl, $-CH_2-CH_2OR'$, wherein R' represents $C_1-C_4$ alkyl, or $-CH_2CH_2CN$;
   (b) 10 to 45%, by weight, same basis, of an $\alpha,\beta$-unsaturated diester selected from bis(2-methoxyethyl)-fumarate, bis(2-methoxyethyl)maleate, or mixtures thereof;
   (c) 1 to 10%, by weight, same basis, of an unsaturated monomer containing either a halogen atom or an epoxy group; and
   (d) less than about 5%, by weight, same basis, of polybutadiene, polychloroprene, or polyisoprene having a molecular weight of from about 500 to 4000.

2. The composition of claim 1 wherein said (a) is ethyl acrylate and said (c) is vinyl chloroacetate.

3. The composition of claim 2 wherein said composition comprises about 63%, by weight, of ethyl acrylate, 30%, by weight, of bis(2-methoxyethyl)fumarate, 6%, by weight, of vinyl chloroacetate and 1%, by weight of polybutadiene resin.

4. The composition of claim 1 wherein said (a) comprises a mixture of n-butyl acrylate, 2-methoxyethyl acrylate and 2-cyanoethyl acrylate in the weight percent ratio of about 65:25:10 to about 75:25:5 respectively.

5. The composition of claim 1 wherein said mixture comprises about 53 to 54%, by weight, of n-butyl acrylate, 23 to 22%, by weight, of 2-methoxyethyl acrylate, 7%, by weight, of 2-cyanoethyl acrylate, 10%, by weight, of bis(2-methoxyethyl)fumarate, 6%, by weight, of vinyl chloroacetate, and 1%, by weight, of polybutadiene resin.

6. The cured composition of claim 1.
7. The cured composition of claim 2.
8. The cured composition of claim 3.
9. The cured composition of claim 4.
10. The cured composition of claim 5.

11. A process for preparing a vulcanizable elastomer which comprises copolymerizing, in the presence of an effective amount of a free radical initiator, a mixture of (a) 89 to 40%, by weight, based on the total weight of the composition, of an acrylic acid ester, or mixture of acrylic acid esters, represented by the formula $$CH_2=\overset{\overset{H}{|}}{C}-\overset{\overset{O}{\|}}{C}-OR \quad (I)$$

wherein R represents $C_1-C_4$ alkyl, $-CH_2-CH_2OR'$, wherein R' represents $C_1-C_4$ alkyl, or $-CH_2CH_2CN$;
   (b) 10 to 45%, by weight, same basis, of an $\alpha,\beta$-unsaturated diester selected from bis(2-methoxyethyl)-fumarate, bis(2-methoxyethyl)maleate, or mixtures thereof;
   (c) 1 to 10%, by weight, same basis, of an unsaturated monomer containing either a halogen atom or an epoxy group; and
   (d) less than about 5%, by weight, same basis, of polybutadiene, polychloroprene, or polyisoprene having a molecular weight of from about 500 to 4000.

12. The process according to claim 11 wherein said free radical initiator comprises about 0.01 to 5%, by weight, of azobisisobutyronitrile, based on the total weight of the reactants.

13. The process according to claim 11 wherein said mixture comprises 63%, by weight, of ethyl acrylate, 30%, by weight, of bis(2-methoxyethyl)fumarate, 6%, by weight, of vinyl chloroacetate and 1%, by weight, of polybutadiene resin.

14. The composition of claim 11 wherein said mixture comprises about 53 to 54%, by weight, of n-butyl acrylate, 23 to 22%, by weight, of 2-methoxyethyl acrylate, 7%, by weight, of 2-cyanoethyl acrylate, 10%, by weight, of bis(2-methoxyethyl)fumarate, 6%, by weight, of vinyl chloroacetate, and 1%, by weight, of polybutadiene resin.

* * * * *